United States Patent [19]
Shono

[11] B 3,990,085
[45] Nov. 2, 1976

[54] MEASUREMENT MODE INTERLOCK MECHANISM IN CAMERA TTL LIGHT MEASURING SYSTEM

[75] Inventor: Tetsuji Shono, Saitama, Japan

[73] Assignee: Asahi Kogaku Kogyo Kabushiki Kaisha, Tokyo, Japan

[22] Filed: Oct. 16, 1974

[21] Appl. No.: 515,135

[44] Published under the second Trial Voluntary Protest Program on February 17, 1976 as document No. B 515,135.

[30] Foreign Application Priority Data
Oct. 19, 1973 Japan.................. 48-122179[U]

[52] U.S. Cl................... 354/46; 354/60 R; 354/60 E; 354/272
[51] Int. Cl.².................. G03B 7/20
[58] Field of Search.......... 354/46, 272, 60 R, 60 E, 354/60 L, 40, 47

[56] References Cited
UNITED STATES PATENTS

| | | | |
|---|---|---|---|
| 3,465,661 | 9/1969 | Hahn et al.......................... | 354/60 E |
| 3,470,807 | 10/1969 | Uno.................................. | 354/40 X |
| 3,486,434 | 12/1969 | Suzuki et al...................... | 354/46 X |
| 3,589,252 | 6/1971 | Hahn et al........................ | 354/46 X |
| 3,603,234 | 9/1971 | Strehle et al..................... | 354/40 X |
| 3,721,168 | 3/1973 | Noack et al. .................... | 354/47 |
| 3,785,266 | 1/1974 | Watanabe......................... | 354/46 |

*Primary Examiner*—L. T. Hix
*Assistant Examiner*—James LaBarre
*Attorney, Agent, or Firm*—Wolder & Gross

[57] ABSTRACT

A single lens reflex camera of the TTL light measuring type and mounting interchangeable objective lenses of the fully open and stopped down aperture light measuring type includes a two coil differential meter. One of the meter coils is connected through a photocell to a battery and the other coil is connected between the battery grounded first terminal and the arm of a double throw switch. An adjustable first resistor is connected between the switch first contact which is grounded through a normally open second switch and an objective aperture varied second resistor is connected between the battery ungrounded terminal and the first switch second contact. The open aperture light measuring objective lens is provided with an actuating element which functions upon mounting of the lens to close the second switch to short circuit the second coil when the first switch first contact is closed, thereby disabling the light measuring circuit and providing an indication thereof.

6 Claims, 3 Drawing Figures

MEASUREMENT MODE INTERLOCK MECHANISM IN CAMERA TTL LIGHT MEASURING SYSTEM

BACKGROUND OF THE INVENTION

The present invention relates generally to improvements in single lens reflex cameras provided with through the lens light measuring systems and it relates more particularly to an improved TTL light measuring single lens reflex camera of the type provided with interchangeable objective lens of the fully open and stopped down aperture light measuring types, and to an improved mechanism for inhibiting and indicating the improper selection of a stopped down light measurement mode with the use of an objective lens of the fully open aperture light measuring type.

In single lens reflex cameras of the TTL light measuring type, when the light is measured with a full aperture light measuring type objective mounted on the camera, the indication on the exposure control meter often differs in a full aperture light measurement from that in a stop-down light measurement depending on the error derived from converting the F-value obtained in the full aperture light measurement into an electric resistance, or on the difference between the indicated $F_{NO}$ and real $F_{NO}$. It has been almost impossible to practically precisely coincide these. The difference in the exposure control meter indication between the full aperture light measurement and the stop-down light measurement confuses and perplexes the photographer and leads to errors in photographing operation.

SUMMARY OF THE INVENTION

It is a principal object of the present invention to provide an improved single lens reflex camera.

Another object of the present invention is to provide an improved through the lens light measuring system in a single lens reflex camera.

Still another object of the present invention is to provide an improved through the lens light measuring system operable with interchangeable objective lenses of the fully open aperture and stopped down aperture light measuring types.

A further object of the present invention is to provide a system of the above nature characterized by its simplicity, reliability and high versatility and adaptability.

The above and other objects of the present invention will become apparent from a reading of the following description taken in conjunction with the accompanying drawings, which illustrate a preferred embodiment thereof.

In one sense, the present invention contemplates the provision of a through the lens light measuring system in a single lens reflex camera which is provided with a circuit for measuring fully open aperture light and a circuit for measuring stopped down aperture light and a switch which is actuated by the mounting of fully open aperture light measuring objective lens which disables the stopped down aperture light measuring system and provides an indication thereof, thereby preventing the use of the stopped down aperture light measuring circuit with the fully open aperture light measuring objective lens, thereby preventing any photographing errors due to such improper use of the light measuring network. In its preferred form, the light measuring network includes a differential current meter including a first coil connected through a photoconductor to a battery source and a second coil connected through a double throw switch selectively through a diaphragm aperture responsive variable resistor and through another resistor to the battery, and a normally open second switch which is closed by a mounted fully open aperture light measuring objective lens to short circuit the meter second coil when the first switch is positioned to select the stopped down aperture light measuring circuit.

BRIEF DESCRIPTION OF THE DRAWINGS

FIG. 3 is a view similar to FIG. 2, but shown in a second lens adjusted position.

DESCRIPTION OF THE PREFERRED EMBODIMENT

Figure 1:
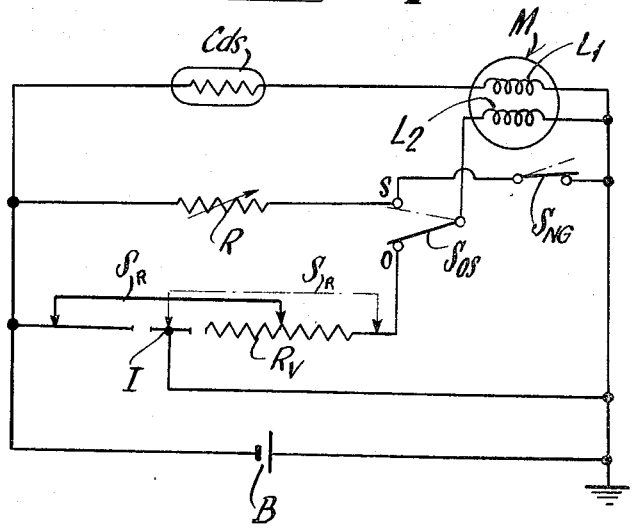
FIG. 1 is a schematic view of the circuit network of a preferred embodiment of the present invention.

Referring now to the drawings which illustrate a preferred embodiment of the present invention, the reference letter B generally designates a power battery, and CdS designates a light receiving photosensitive element such as a photoconductor arranged in the camera body for TTL light measurement in the known manner and M designates a differential meter. The power battery B, light receiving element CdS and a first coil L1 of meter M are connected in series. Indicated at R is a semi-fixed or adjustable resistor for adjustment of meter sensitivity in the aperture stopped down light measurement circuit and $S_{NG}$ is a switch for opening the circuit to thereby render the aperture stopped down light measurement inoperative. The switch $S_{NG}$ is normally closed when the full aperture light measuring objective is mounted on the camera body. A selector switch $S_{OS}$ serves to transfer the network between the full aperture light measurement and stopdown light measurement circuits and is provided with a full aperture light measuring contact or terminal O and a stop down light measuring contact or terminal S. The semi-fixed resistor R and switch $S_{NG}$ are series connected by way of the stop down light measuring terminal S of the selector switch $S_{OS}$ and further connected in parallel with the power battery B. The middle point or arm of selector switch $S_{OS}$ is connected to one terminal of the second coil L2 of meter M. Between the full aperture light measuring terminal O and the positive terminal of power battery B is connected a slide or variable resistor $R_V$ which is provided with a wiper contact or slide $S_R$ for converting $F_{NO}$ into an electric quantity. At one end of slide resistor $R_V$ proximate to the power battery B is located a grounded conductor contact or segment I. As shown in FIG. 1 by full line, the slide $S_R$ of slide resistor $R_V$ has one end connected to the positive terminal of power battery B and the other end which slides on the slide resistor $R_V$ in association with the operation of the lens diaphragm adjusting ring.

When the selector switch $S_{OS}$ is manually operated to close the full aperture light measuring terminal O, the resistance value of slide resistor $R_V$ corresponding to the diaphragm value of the lens diaphragm adjusting ring and the resistance value of light receiving element CdS corresponding to the received light quantity are applied to the differential meter M. When these two resistance values are equal to each other, the needle of meter M assumes its center position to thereby indicate the proper or optimum exposure reached. On the other hand, when the selector switch $S_{OS}$ is operated to close the stop down light measuring terminal S, the lens diaphragm is concurrently stopped down. At this moment a terminal voltage is developed across the coil L1 of meter M; whereas since the selector switch $S_{OS}$ is in a position where the stop down light measuring terminal S is closed, no potential difference appears across the coil L2 and the needle of meter M is fully deflected to thereby indicate that light measurement cannot be effected.

Considering now the operation of the camera mounting a stop down light measuring objective, upon mounting such an objective the switch $S_{NG}$ opens and the slider $S_R$ stops at a position shown in FIG. 1 by the broken line, where the wire segment I and the full aperture light measuring terminal O of selector switch $S_{OS}$ are shorted together. Thus, when the selector switch $S_{OS}$ is thrown to the full aperture light measuring terminal O, the meter M fully deflects and the full aperture light measurement cannot be effected; whereas when the selector switch $S_{OS}$ is switched over to the stop down light measuring terminal S, the lens diaphragm instantly initiates a stop down operation. When the resistance value of light receiving element CdS and the resistance value of semi-fixed resistor R are adjusted so that they become equal to each other, the needle of meter M deflects to the center position thereby representing that the optimum exposure has been attained.

Figure 2:
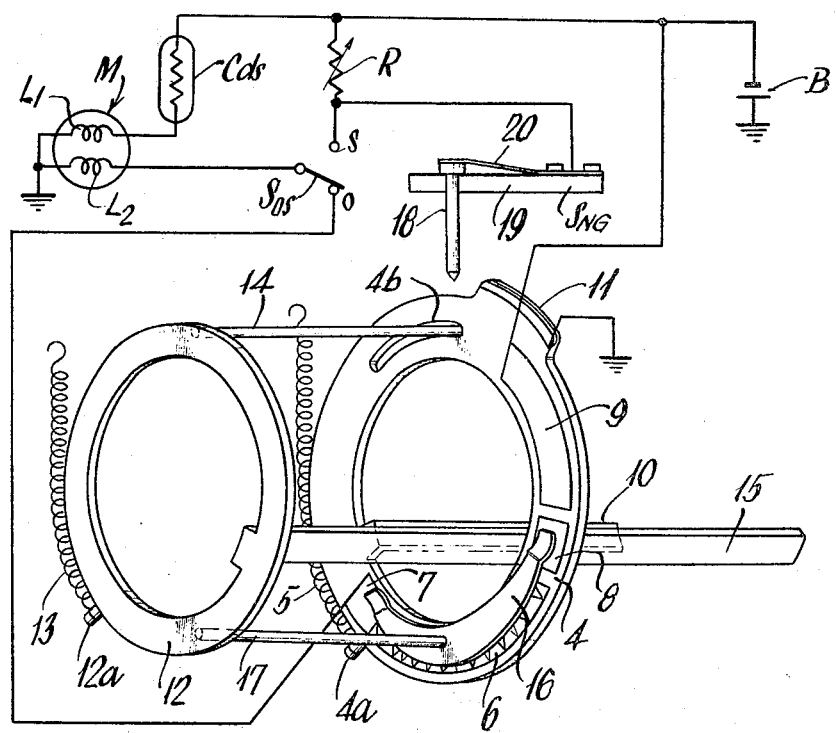
FIG. 2 is a perspective view of the improved mechanism and the associated circuit network in a first lens adjusted position.
Figure 2:
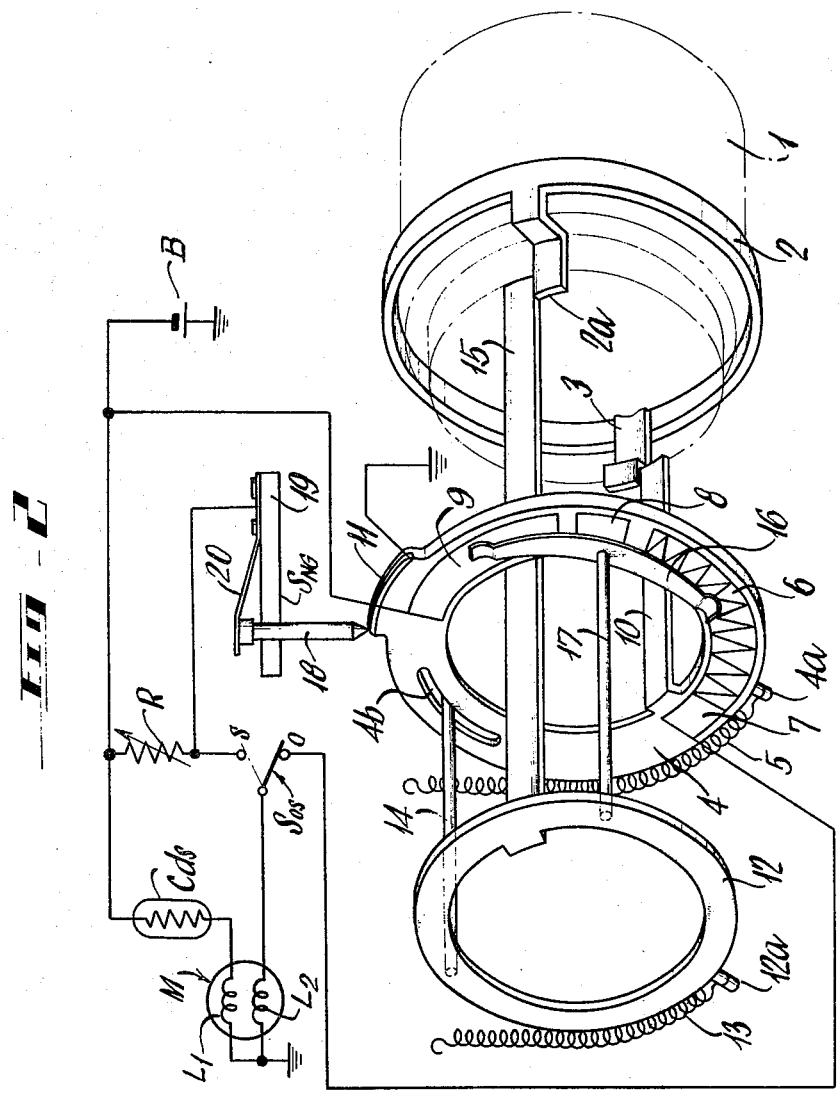

Referring now to FIGS. 2 and 3, indicated at 1 is an objective lens of the full aperture light measuring type and 2 is a diaphragm adjusting ring carrying an engaging projection 2a. The diaphragm adjusting ring 2 is formed and dimensioned to have an inner diameter just fitting around the objective 1. An engaging or coupling member 3 is fixedly mounted on the objective 1. A correction ring 4 formed of an electrically insulating material is coaxial with ring 2 and is normally urged clockwise (as viewed in FIGS. 2 and 3) by a tension spring 5 which is connected between the camera body (not shown) and a projection 4a formed on the outer circumference of the correction ring 4. A resistance element or resistor 6 and metal surfaces or contacts 7, 8 and 9 are concentrically located on a common surface of the correction ring 4 to form the sliding resistor $R_v$ of FIG. 1. The metal surface 7 is connected to the full aperture light measuring terminal O of selector switch $S_{OS}$, the metal surface 9 is connected to the positive terminal of power battery B and the metal surface 8 is grounded. Indicated at 10 is a longitudinally extending coupling arm or engaging bar which is perpendicular to the plane of the correction ring 4, so that it is engageable by the engaging member 3. The correction ring 4 carries on its outer circumference an outwardly projecting circumferential portion 11 whose outer circumference is covered with an electrically conducting material which is grounded. A diaphragm operating ring 12 is urged clockwise (as viewed in FIGS. 2 and 3) by a tension spring 13 which is connected between the camera body and a radial projection 12a formed on the outer circumference of the diaphragm operating ring 12. A pin 14 has one end affixed to the diaphragm operating ring 12 and projects perpendicular to the plane thereof. The opposite end of pin 14 is loosely engaged into an elongated arcuate slot 4b formed in and concentric with the correction ring 4 for thereby limiting the rotation angle of the diaphragm operating ring 12. An engaging bar or coupling arm 15 extends perpendicularly from the diaphragm operating ring 12 so that the forward end thereof engages the engaging projection 2a on the diaphragm adjusting ring 2. A pin 17 has one end affixed to the diaphragm operating ring 12 and an opposite end carrying a contact slide 16 which is slideable over the metal surfaces 7, 8 and 9 on the correction ring 4. Indicated at 18 is a switch actuating rod made of metal, which is vertically movable in a guide hole formed in an insulator plate 19 mounted on the camera body. The forward or lower end of switch actuating rod 18 is located in the path of the radially projecting circumferential portion 11 on the correction ring 4; whereas the rear or upper end of the switch rod 18 is engaged by a leaf spring 20 connected to the stop down light measuring terminal S so that the switch rod 18 is urged downwards as viewed in FIGS. 2 and 3.

In the operation of the mechanism described above, when the full aperture light measuring type objective 1 is screwed into the camera mount, counter-clockwise (as viewed in FIGS. 1 and 2,) the engaging projection 2a on the diaphragm adjusting ring 2 is brought into engagement with the engaging bar 15 during the final rotation of the objective 1. When the objective 1 is further screwed into the lens mount, the diaphragm operating ring 12 which is integral with the engaging bar 15 is rotated counter-clockwise against the action of tension spring 13. At this moment, the engaging member 3 is engaged by the engaging bar 10 so that the correction ring 4 is similarly rotated counter-clockwise against the action of tension spring 5. As a result, the contact surface of slide 16 which has been in contact with the metal surfaces 7 and 8 is slid until the slide is brought into contact with the resistor 6 and the metal surface 9. On the other hand, with the rotation of correction ring 4 the projecting circumferential portion 11 engages with the switch rod 18 so that the forward end of the switch rod 18 rides on the outer periphery of circumferential portion 11 against the action of the leaf spring 20. Consequently, the switch rod 18 electrically engages the metal surface formed on the outer periphery of projecting circumferential portion 11 and the switch $S_{NG}$ is closed, as shown in FIG. 1. In this condition, in view of their angular positions, the diaphragm adjusting ring 2 and the diaphragm operating ring 12 may be considered as an integral unit and the engaging member 3 and correction ring 4 as another integral unit, so that full aperture photometry can be properly effected irrespective of the error in angular position of the screwed in objective, which is almost inevitable in a screw in type of lens mount.

The mechanism of the present invention has been described in connection with a full aperture photometry by use of a camera provided with a screw in lens mount. It is apparent, however, that similar results can be attained even when the mechanism is applied to a camera provided with a bayonet type lens mount, or a lens mount free from the error in angular position of objective. In this latter case, a member equivalent to the engaging member 3 may be arranged on the objective and a member equivalent to the engaging rod 10 may be arranged on the camera body so that the switch $S_{NG}$ can be operated when the objective is rotatingly mounted on the camera body.

It will be appreciated from the foregoing that the device of the present invention employs the objective lens mounting force for controlling the opening and closing of a switch mechanism which is built in the exposure measuring or controlling meter circuit. This simple arrangement eliminates the possibility that the camera is erroneously or inadvertently operated, in a stop down light measuring mode during performance of full aperture photometry.

While there has been described and illustrated a preferred embodiment of the present invention, it is apparent that numerous alterations, additions and omissions may be made without departing from the spirit thereof.

I claim:

1. In a single lens reflex camera including a through the lens light measuring network provided with alternatively actuatable fully open and stopped down aperture light measuring first and second circuits and a current meter responsive to the incident light; manually operative selector means for selectively alternatively actuating said first and second light measuring circuits, objective lenses interchangeably mounted on said camera and provided with means for identifying said respective lenses as being alternatively of the fully open aperture light measuring type and of the stopped down aperture type respectively, and means responsive to the concurrent mounting of an objective lens identified as a fully open aperture type and to the manual selection of said second circuit for disabling the light measuring operation of said network, said selector means being operable independently of the objective type of mounted on said camera lens.

2. The single lens reflex camera of claim 1 wherein said disabling means provides an indication through said meter device of the selection of said second light measuring circuit in response to the mounting of said fully open aperture light measuring objective lens.

3. The single lens reflex camera of claim 1 wherein said meter comprises a differential meter including first and second coils, said light measuring network includes a current source and a photosensitive element connected in series with said first coil to said current source, said first circuit includes a variable first resistor responsive to the objective lens aperture opening setting and said selector means includes a first switch for alternatively connecting said second coil in series with said first resistor to said current source and to said current source independently of said first resistor.

4. The single lens reflex camera of claim 3 wherein said second circuit includes a second resistor, said first switch includes a transfer arm connected through said second coil to a first terminal of said battery source, a first contact connected through said first resistor to the current source second terminal and a second contact connected through said second resistor to said current source second terminal and comprising a normally open second switch closed in response to the mounting of said fully open aperture light measuring objective lens connected between said first switch second contact and said current source first terminal.

5. The single lens reflex camera of claim 3 wherein said disabling means comprises a normally open second switch closed in response to the mounting of a full aperture light measuring objective lens and connected to short circuit said second coil in response to the closing of said second switch and the positioning of said first switch to connect said second coil to said current source independently of said first resistor.

6. In a single lens reflex camera a through the lens light measuring network including a fully open aperture light measuring first circuit and a stopped down aperture light measuring second circuit and manually operated switch menas for selectively alternatively actuating one of said circuits, an interchangeable fully open aperture light measuring objective lens separably mountable on said camera, and means responsive to the concurrent mounting of said objective lens and to the actuation of said second circuit for disabling said light measuring network.

\* \* \* \* \*